Figure 7:
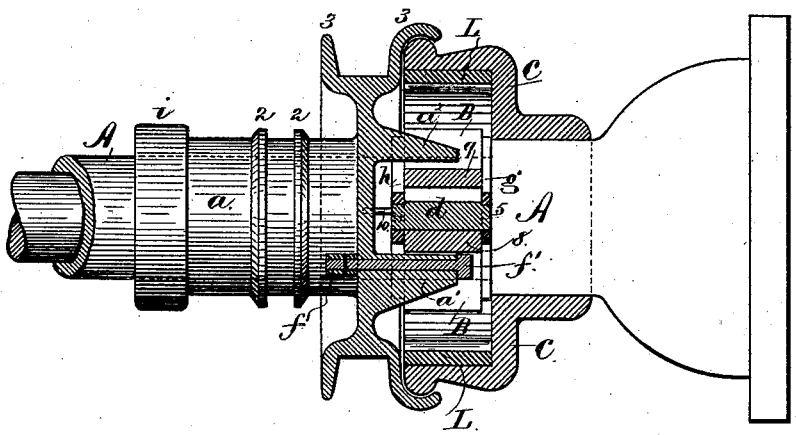

(No Model.) 2 Sheets—Sheet 1.
J. HARTNESS.
CLUTCH FOR WHEELS AND AXLES.
No. 378,957. Patented Mar. 6, 1888.
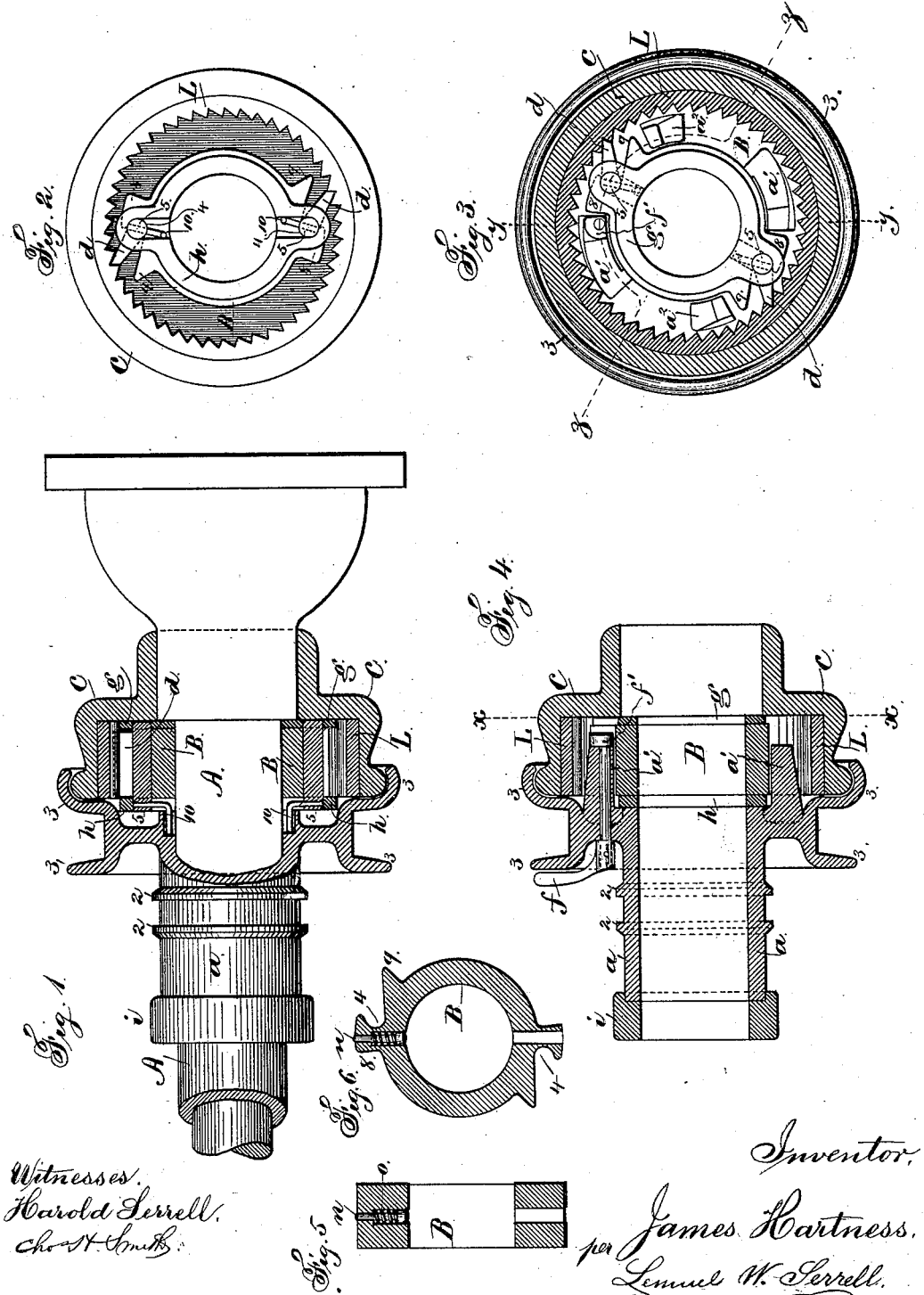
Witnesses.
Harold Serrell.
Chas. H. Smith.
Inventor,
James Hartness.
per Lemuel W. Serrell.
Atty.

(No Model.) 2 Sheets—Sheet 2.

J. HARTNESS
CLUTCH FOR WHEELS AND AXLES.

No. 378,957. Patented Mar. 6, 1888.

Witnesses/
Harold Serrell
Chs H Smith

Inventor
per James Hartness
Lemuel W. Serrell
atty

UNITED STATES PATENT OFFICE.

JAMES HARTNESS, OF TORRINGTON, CONNECTICUT, ASSIGNOR TO THE UNION HARDWARE COMPANY, OF SAME PLACE.

CLUTCH FOR WHEELS AND AXLES.

SPECIFICATION forming part of Letters Patent No. 378,957, dated March 6, 1888.

Application filed October 11, 1887. Serial No. 252,042. (No model.)

*To all whom it may concern:*

Be it known that I, JAMES HARTNESS, of Torrington, in the county of Litchfield and State of Connecticut, have invented an Improvement in Clutches for Wheels and Axles, of which the following is a specification.

This invention is primarily intended for connecting the driving-wheels of bicycles and tricycles with the actuating collar or sleeve; but it is available for connecting loose wheels and axles.

The object of this invention is to actuate the pawls in both directions. In my improvement the mechanism that acts through the pawl swings the same so that its end passes into the ratchet-teeth, and when the actuating device moves in the other direction the end of the pawl is first lifted out of contact with the ratchet-wheel, thereby avoiding the wear and noise heretofore usually occurring with ratchet-and-pawl connections.

I am aware that in some instances clamping-blocks with toggle-links similar to a sewing-machine-wheel feed have been used, in which the pawl-teeth are drawn away from the rim by the backward movement, and also that connections have been made to the outer ends of pawls to turn them toward and from the ratchet-teeth by the action of springs and a friction-collar. In my improvement the inertia of the parts is made to move the pawls toward and from the ratchet-teeth.

In the drawings, Figure 1 is an elevation of the axle and section of the clutch without the actuating-chains. Fig. 2 is an elevation endwise of the ratchet-pawls and pawl-cage. Fig. 3 is a section at the line $x$ $x$ of Fig. 4. Fig. 4 is a longitudinal section at the line $y$ $y$ of Fig. 3. Fig. 5 is a transverse, and Fig. 6 a central, section of the pawl-cage; and Fig. 7 is a sectional plan at the line $z$ $z$ of Fig. 3.

My improvements are represented as applied to the axle of a tricycle, such as is driven by levers and chains acting in opposite directions around the tubular sleeve $a$, the chains and levers acting to rotate the sleeve $a$ first in one direction and then the other. One chain or band is to pass in one direction between the ribs 2 2 and around the sleeve, and the other chain passes in the other direction around the grooved flange of the sleeve between the ribs 3 3. There is a collar, $i$, upon the axle A at the end of the sleeve $a$. The hub or shell C is fastened upon the axle A and revolves with it; but the sleeve $a$ and pawl-cage B are loose upon such axle.

The ratchet-teeth are made upon the inside of a steel ring, L, and afterward the ring is inserted into the shell and made fast to it. This gives opportunity for accurately making the teeth and for lessening the wear, because the steel ring and teeth possess great durability.

Between the sleeve $a$ and the hub and within the ratchet-ring is the pawl-cage B, in the form of a ring, with recesses 4 for the rounded inner ends of the pawls $d$; and there are circular projections 5, corresponding to the rounded end of the pawl, and these circular projections enter holes in the rings $h$ and $g$, and form the pivots for the pawls, so that such pawls can swing and engage the ratchet-teeth, or the reverse.

The pawl-cage B is made with stop projections 8 9, that limit the movements of the pawls as they swing away from the ratchet-teeth.

Upon the sleeve or chain-drum $a$ are arms $a'$ $a^2$, passing into the shell C, and these arms $a'$ $a^2$ are slightly farther apart than the projections upon the pawl-cage B, so that when the chain-drum is turned in one direction the arms $a'$ will act behind or against the projections 8 upon the pawl-cage and give motion to the pawl and to the ratchet-wheel and shell C and the wheel or axle to which it is connected, and when the chain-drum is turned in the other direction the arms $a^2$ will move a short distance and then come into contact with the projections 9 and move the pawl-cage and pawls backwardly, the ends of the pawls being simultaneously thrown out of contact with the ratchet-teeth, as next described. I provide for swinging the pawls upon their axis by small cranks and pins 10 entering loosely into parallel holes in the inner face of the chain-drum.

It will now be apparent that when the arms $a'$ are acting to push the pawl-cage and pawls around, the ends of the pawls will be swung outwardly by the action of the cranks 10; but the moment the rotation of the chain-drum is arrested the inertia of the parts causes the shell C, pawl-cage, and pawls to continue their movement until the pawl ends are swung out of contact with the ratchet-teeth and stopped against the projections 9. By this time the arms $a^2$ will have come into contact with the radial faces of said projections 9 and will either prevent the further rotation of the pawl-cage in the direction of the wheel or will turn such pawl-cage and pawls backwardly to the extent of the backward rotary movement given to the chain-drum. When the chain-drum is again turned in the opposite direction, the inertia of the pawl-cage causes the same to remain stationary until the pawls are swung outwardly into contact with the ratchet-teeth by the cranks 10, and simultaneously therewith the arms $a'$ come up against the radial faces of the back projections, 8, and the pawl-cage, pawls, ratchet-wheel, and shell revolve together.

In reaping and mowing machines a chain-drum will not be made use of, but the tubular sleeve $a$ will be fastened to the axle and the shell C will form part of the hub of the wheel and be loose upon the axle, so as to allow one wheel to move faster than the other, or the wheel to be turned backwardly without revolving the shaft.

I make use in bicycles or tricycles of a cam, $f'$, upon a shaft passing through one of the arms $a'$, and having a handle or lever, $f$, at the outer end. When in the position shown in Fig. 4, this cam $f'$ is out of action; but if a half-turn is given to the same the projecting portion of the cam coming against the adjacent face 8 moves the same and causes the pawls to be thrown out of contact with the ratchet-teeth; hence the ratchet mechanism at either side of a bicycle-wheel, or with either driving-clutch of a tricycle, can be thrown out of action and locked, so as to remain inoperative until the lever $f$ is turned back again to its normal position.

Usually the arms $a'$ will be heavier and stronger than the arms $a^2$, because the propelling force acts through the arms $a'$, and the arms $a^2$ only have to overcome the inertia and friction and turn the pawl-cage and its rings backwardly with the pawls out of contact with the ratchets.

If desired to prevent looseness of the pawl-cage B, a stud, $n$, may be made use of, as seen in Figs. 5 and 6, the same having a spring, $o$, around it to press the head of the stud into contact with the surface of the axle or shaft. This friction-stud is preferably within a hole bored in one of the projections 8.

By this improvement the inertia is availed of in swinging the pawls out of contact with the ratchet-teeth, and in swinging them again into action, and the ends of the pawls do not rub over and in contact with the ratchet-teeth on the backward movement, and there are not springs or frictional devices to become injured or out of repair.

This improvement may be employed with the main wheel of a bicycle in which the pawls and pawl cages and sleeves will be used at both sides of such wheel. In this case the side levers and single chains can be used to actuate such devices, there being springs, as usual, to give the backward movement.

I claim as my invention—

1. The combination, with an internal ratchet-wheel, of a pawl-cage and pawls within the wheel, cranks upon the pawls for swinging the same, a sleeve into holes in which the cranks are received, and projections from the sleeves acting against projections upon the pawl-cage to give motion to the same, there being sufficient play between the arms and the projections to swing the pawls into or out of contact with the ratchet-wheel, substantially as set forth.

2. The combination, with a shell fixed upon the shaft and having internal ratchet-teeth, of a chain-drum loose upon the shaft, arms projecting from the drum into the recess of the shell, pawls, a pawl-cage, and rings forming the pivots for the pawls, and projections against which the arms of the chain-drum act, and cranks upon the pawls for moving the same into and out of contact with the ratchet-teeth, substantially as set forth.

3. The combination, with the shell, of a separate steel ring having internal ratchet-teeth and secured within the shell, an axle or shaft for the shell, a pawl-cage around such axle, and the pawls thereupon acting against the ratchet-teeth, a chain-drum having projections that act against the projections on the pawl-cage, and crank-arms for throwing the pawls into and out of action, substantially as set forth.

4. The combination, with the shell and internal ratchet-teeth and the shaft or axle, of a pawl-cage, pawls pivoted to the cage, a chain-drum having projections that act against projections on the pawl-cage, the cam $f'$, shaft, and lever $f$, for throwing the pawls out of action and locking the parts, substantially as set forth.

Signed by me this 14th day of September, 1887.

JAMES HARTNESS.

Witnesses:
JOHN W. BROOKS,
H. M. ROGERS.